United States Patent [19]

Menzin

[11] Patent Number: 5,755,152
[45] Date of Patent: May 26, 1998

[54] POPCORN CAKE MACHINE

[75] Inventor: Marvin Menzin, Lexington, Mass.

[73] Assignee: Hunt-Wesson, Inc., Fullerton, Calif.

[21] Appl. No.: 769,780

[22] Filed: Dec. 19, 1996

[51] Int. Cl.[6] .............................. A23L 1/00; A23L 1/18; A47J 27/08
[52] U.S. Cl. .............................. 99/353; 99/349; 99/372; 99/439; 99/483; 426/445; 426/447; 426/512; 426/523; 425/261; 425/307
[58] Field of Search .............................. 99/331, 353–355, 99/349, 323.4, 372–374, 426, 439, 483; 100/93 P, 324; 425/260, 261, 523, 307, 308, 294, 316; 426/261, 523, 512, 445–447, 454, 461, 618

[56] References Cited

U.S. PATENT DOCUMENTS

| 3,425,363 | 2/1969 | Carbon. | |
|---|---|---|---|
| 3,650,763 | 3/1972 | Touba. | |
| 3,857,331 | 12/1974 | Griner. | |
| 3,949,660 | 4/1976 | Kuhlman. | |
| 4,202,257 | 5/1980 | Masuda et al. | 99/348 |
| 4,281,593 | 8/1981 | Gevaert | 99/349 |

(List continued on next page.)

FOREIGN PATENT DOCUMENTS

| 799316 | 9/1973 | Belgium. |
|---|---|---|
| 886895 | 6/1981 | Belgium. |
| 893770 | 3/1982 | Belgium. |
| 901492 | 2/1985 | Belgium. |
| 902360 | 2/1985 | Belgium. |
| 906029 | 6/1987 | Belgium. |

(List continued on next page.)

OTHER PUBLICATIONS

Puffing of Rice Cakes as Influenced by Tempering and Heating Conditions, F. Hsieh, H.E. Huff I.C. Peng, and S.W. Marek—Journal of Food Science vol. 54, No. 5. 1989.

Pretreating Dent Corn Grits for Puffing in a Rice Cake Machine. F. Hsieh, L. Hu I.C. Peng, and H.E. Huff—Journal of Food Science, vol. 55, No. 5. 1990.

Rice Cake Production using Long-frain and Medium-grain Brown Rice H.E. Huff, F. Hsieh, and I.C. Peng, Journal of Food Science, vol. 57, No. 5. 1992.

*Primary Examiner*—Timothy F. Simone
*Attorney, Agent, or Firm*—Pretty, Schroeder & Poplawski

[57] ABSTRACT

A grain cake baking machine having an upper mold, a ring mold and a lower mold, with the upper and lower molds sliding in the ring mold and defining a mold cavity, a first drive for moving the lower mold relative to the ring mold between a vent position and an intermediate baking position, and an unload position extending to the upper end of the ring mold for discharging the cake, a second drive for moving the upper mold relative to the ring mold between a load position out of the ring mold for loading grain and unloading a cake, and a baking position within the ring mold, a third drive for loading a charge of grain into the ring mold when the upper and lower molds are in the load positions, with the first drive moving the lower mold to the load position for venting the mold cavity, and heaters for the upper and lower molds. The first drive may include a shaft carrying the lower mold, a brake bar carried on the shaft, a brake for clamping the brake bar in a fixed position in the housing, a spring between the shaft and the housing for urging the shaft and lower mold away from the ring mold, a drive for moving the shaft and lower mold to the baking position, and a brake control to clamp the brake bar, shaft and lower mold in the baking position, with the spring means moving the lower mold to the vent position when the brake is actuated to release the brake bar. The brake mechanism also may be used with the upper mold alone and with both upper and lower molds as desired. A method of baking is also disclosed.

14 Claims, 9 Drawing Sheets

U.S. PATENT DOCUMENTS

| | | | |
|---|---|---|---|
| 4,328,741 | 5/1982 | Yoshikazu | 100/324 X |
| 4,571,341 | 2/1986 | Sugimura | 426/523 X |
| 4,667,588 | 5/1987 | Hayashi . | |
| 4,671,759 | 6/1987 | Hayashi et al. | 425/294 |
| 4,854,842 | 8/1989 | Kobayashi | 425/308 X |
| 4,966,542 | 10/1990 | Kobayashi | 425/307 |
| 5,019,412 | 5/1991 | Hatori | 426/242 |
| 5,102,677 | 4/1992 | Van Den Berghe | 425/261 X |
| 5,376,395 | 12/1994 | Pels | 99/439 X |
| 5,467,693 | 11/1995 | Van Den Berghe | 99/353 |
| 5,562,021 | 10/1996 | Slanik | 99/349 |
| 5,591,491 | 1/1997 | Ando et al. | 426/244 X |

FOREIGN PATENT DOCUMENTS

| | | |
|---|---|---|
| 1001337A7 | 3/1989 | Belgium . |
| 1000927A6 | 5/1989 | Belgium . |
| 0 241 972 A3 | 10/1987 | European Pat. Off. . |
| 0 344 867 B1 | 6/1989 | European Pat. Off. . |
| 0 344 867 A1 | 12/1989 | European Pat. Off. . |
| 45-27781 | 3/1967 | Japan . |
| 48-58180 | 2/1973 | Japan . |
| 5426386 | 2/1977 | Japan . |
| 58-121784 | 6/1983 | Japan . |
| 62-6624 | 8/1985 | Japan . |
| 61-96952 | 5/1986 | Japan . |
| 63-181941 | 6/1987 | Japan . |
| 63-116647 | 4/1988 | Japan . |
| 63-112950 | 5/1988 | Japan . |
| 63-112949 | 6/1988 | Japan . |
| 2-215336 | 9/1990 | Japan . |
| 9001357 | 1/1992 | Netherlands . |
| WO 88/00797 | 2/1988 | WIPO . |
| WO 89/06092 | 7/1989 | WIPO . |
| WO 90/08477 | 8/1990 | WIPO . |

POPCORN CAKE MACHINE

BACKGROUND OF THE INVENTION

This invention relates to apparatus and methods for forming baked grain cakes, such as rice cakes and popcorn cakes.

A number of machines of this type have been developed, and they include one or more heated mold components which are moved away from one another for loading grain and unloading a baked cake, and movable toward one another for compressing and baking the grain into a cake.

One such machine is shown in the Gevaert, U.S. Pat. No. 4,281,593. The Gevaert patent describes a machine for preparing food products from cereals which have been pressure cooked and thereafter expanded.

The machine includes a mold comprised of a hollow die 1 in the shape of an inverted container which cooperates with a punch 2 which by sliding inside the die, can close and open the mold cavity. The punch is operated by a jack 22 and hinged arm assemblies 17, 18. A stop bar 27, operated by a jack 30, is used to stop the hinged arm assembly when the punch reaches a position to permit expansion of the cereal within the mold. A cereal feed regulator 36 is also provided to receive cereal from the cylinder 42 and deposit the cereal onto the punch head 5.

After feeding the cereal onto the punch head, the punch is inserted into the cavity of the die 1. The hinged arm assembly is nearly vertical in this position. The stop bar 27 is then lowered to a position in which it lies in the path that arm 17 will have to follow to lower the punch. After cooking, the punch is lowered, but the stop bar 27 engages the bearing surface 35 to limit the downward movement of the punch. In this position (shown in dashed lines), the cereal expands inside the mold. After expansion, the stop bar 27 is raised by the jack 30 and the punch is lowered to a position wherein the cooked cake is discharged and a new charge of cereal is placed on the punch.

Another prior machine is shown in the Yoshikazu, U.S. Pat. No. 4,328,741. This patent relates to a machine for producing a cracker by compressing, cooking and expanding rice. The steps for forming such a cracker are shown in FIGS. 4–7.

The machine includes a lower baking mold 6 having a movable bottom plate 7 that incorporates an electric heater 8. The bottom plate 7 is mounted to an air cylinder through a connecting rod 10. An upper baking mold 14, disposed above the lower baking mold is connected to another air cylinder through a reciprocating rod 13. The upper baking mold also has an electric heater 15.

The upper baking mold 14 has a protruding press seat 14a formed in its lower surface. When the upper baking mold is moved downwardly, the press seat 14a is snugly received within the lower baking mold 6 so that a chamber closed in a fluid type manner is defined within the lower baking mold.

In operation, the upper and lower baking molds are heated. When the upper baking mold is at its upper position, a feeding plate is moved between the molds and transfers a charge of rice material G into the lower baking mold 6. The upper baking mold is then moved downwardly to be snugly fitted within the lower baking mold 6, whereby the rice material contained within the lower baking mold is compressed and heated (FIG. 4). After cooking for a predetermined period, the upper mold is moved upward, which permits the rice material G within the lower baking mold to expand and permits steam within the baking mold to exhaust (FIG. 5). Next, the upper baking mold is again caused to move downwardly to be snugly fitted within the lower baking mold. In this manner, the rice material G expanded within the lower baking mold 14 is compressed and shaped to produce a rice cracker G' (FIG. 6). Again, after a predetermined cooking time, the upper mold is moved upwardly. The bottom plate 7 of the lower baking mold is also moved upwardly to lift the rice cracker G' to the height of the upper edge of the lower baking mold (FIG. 7). The feeding plate is then moved forwardly to discharge the rice cracker G'.

A similar machine is disclosed in Japanese patent application No. 48-58180. This Japanese patent application shows a machine including an upper mold 6 that may be raised and lowered and a pan 4 having a bottom portion that may also be raised and lowered by a cylinder 8. The heater 5 is located on the bottom of pan 4 and around the peripheral side.

Grain is conveyed to a location just above the pan by the feeding plate 2. The grain is then pressurized by closure of the upper mold 6 and subsequently expanded. The expanded cake is then discharged by raising the bottom portion of the pan.

Another form of such a machine is shown in the patent to Van den Berghe, U.S. Pat. No. 5,102,677. This patent is concerned with a machine for making a cracker from cereals which are pressure baked in a heated mold and afterwards expanded.

The machine includes a baking mold 1, a feeding device 2 and a drive system 3. In this embodiment, the baking mold has two parts, a fixed upper mold 4 in the form of a hollow die and a movable, heatable lower die 5 in the form of a punch.

The punch is fixed to a shaft 6, which is driven by a transmission member 16 in the form of a two arm joint 17, 18. The drive system 3 consists of two separately controlled hydraulic cylinders 11 and 12, arranged in a line back to back. Drive shaft 14 extends from the cylinder 12, and directly actuates the transmission member 16. Drive shaft 14' extends from cylinder 11 and drives the whole assembly body of both cylinders. In operation, both drive shafts 14, 14' are fully extended to raise the punch 5 fully into the hollow die 4. For expansion, the drive shaft 14 only is retracted, lowering the punch and transmission members. Next, the drive shaft 14' is retracted into its cylinder to lower the punch further, opening the mold.

The Van den Berghe patent also discloses a three part mold, shown in FIG. 8a. The three part mold includes a heatable, fixed upper mold, a moveable peripheral mold 41 and a heatable moveable lower mold 5 adapted to be slideably received within the mold cavity formed by the fixed upper mold and the peripheral ring mold. The cooked cereal is expanded by retracting the moveable lower mold to an intermediate position within the mold cavity which is still closed. Next, the peripheral mold is lowered, whereby the peripheral mold slides over the head of the lower mold and is stopped in a bottom position wherein the upper surface of the peripheral mold is substantially level with or below the top of the lower mold, wherein the expanded cracker can be discharged without hinderance from the lower peripheral mold.

A variation of this machine is shown in the Van den Berghe U.S. Pat. No. 5,467,693. Another form of cooking machine is shown the patent to Pels, U.S. Pat. No. 5,376,395. The Pels patent is directed to a machine for cooking rice cakes. A schematic representation of the mold components of the Pels machine is shown in FIG. 1.

The machine includes a bottom end wall 1, a top end wall 2 and a cylindrical side wall 3. Both end walls 1 and 2 fit closely within the cylindrical side wall 3. Thus, when the end walls 1 and 2 are in, for example, respective positions P4 and P3, there is defined between the three walls a small molding volume in which a suitable mixture may be cooked. Both the end walls 1 and 2 can be moved to various positions axially of the generally cylindrical side wall 3. This movement is produced by pneumatic cylinders.

In operation, after cereal has been fed into the molding volume, the end wall 2 is forced down and the end wall 1 is forced up to compress the cereal. After the lapse of a predetermined cooling period, end walls 1 and 2 move apart at speeds such that end wall 2 reaches P2 at the same time that end wall 1 reached P5. Rapid expansion of the chamber causes a rapid expansion of the cereal, and the pressure release from both ends of the mold as end walls 1 and 2 clear the side wall 3, causes the expansion to halt. The shape of the cereal cake is determined at this instant. Then, end wall 2 continues to raise to position P2 to eject the cereal cake from within the mold 3.

One of the problems with the various earlier machines is the time involved in the baking operation and in particular, the time needed for achieving significant expansion of the baked grain product.

Accordingly, it is an object of the present invention to provide a new and improved grain baking machine and method of baking which will achieve improved expansion of the product as well as reduce the time required for baking individual cakes. These are important features since the machine will be used in high production rate making products with relatively low price per unit, and output from the machine will be a significant factor in the cost of the finished product.

Some prior machines have used compressed air drives for moving the molds, in order to achieve faster mold opening during expansion of the heated grain. Because of the large surface area of the mold, typically four inches in diameter, considerable drive forces are needed in order to compress the grain in the mold and to move the mold components. The cost of operating a pneumatic system is more than that for a hydraulic system and in high production rate equipment such as the baking machine of the present invention, the difference in operating cost is a factor in the cost of the finished product. The hydraulic operated drive systems also provide for better control of the vent stroke and better control of the shape of the finished cake.

Some prior machines have used mechanical linkages for moving the molds and some have used hydraulic drives for this purpose. Such systems are relatively slow in operation, especially at the start of a motion. This can be a disadvantage where a rapid start is desired, such as in venting a mold to have rapid venting and grain expansion.

Another object of the invention is to provide a machine which can use hydraulic drive mechanisms and still provide improved speed and control in the mold opening for the venting of the mold and expansion of the grain.

SUMMARY OF THE INVENTION

The grain cake baking machine of the invention includes an upper mold, a ring mold and a lower mold, with the upper and lower molds sliding in the ring mold and defining a mold cavity, first means for moving the lower mold relative to the ring mold between a vent position and an intermediate baking position, and an unload position extending to the upper end of the ring mold for discharging the cake, second means for moving the upper mold relative to the ring mold between a load position out of the ring mold for loading grain and unloading a cake, and a baking position within the ring mold, third means for loading a charge of grain into the ring mold when the upper and lower molds are in the load positions, the first means including means for moving the lower mold to the load position for venting the mold cavity, and means for heating the upper and lower molds.

The baking machine may have the ring mold mounted in a housing with the first means including a shaft mounted in the housing for movement toward and away from the ring mold and carrying the lower mold, a brake bar carried on the shaft, brake means for clamping the brake bar in a fixed position in the housing, spring means between the shaft and the housing for urging the shaft and lower mold away from the ring mold, drive means for moving the shaft and lower mold to the baking position, and means for actuating the brake means to clamp the brake bar, shaft and lower mold in the baking position, with the spring means moving the lower mold to the vent position when the brake means is actuated to release the brake bar.

The grain cake baking method includes the steps of moving the lower mold away from the upper mold to a load position, loading a charge of grain into the ring mold, moving the lower and upper molds toward each other to a baking position within the ring mold to compress the grain, heating the lower and upper molds to heat the compressed grain, moving the lower mold away from the upper mold expanding the heated grain and venting gas from the mold cavity, moving the upper mold upward out of the ring mold and moving the lower mold upward at least to the upper end of the ring mold, and moving the baked cake out of the machine.

The method may further include loading a spring loaded shaft carrying the lower mold and a brake mechanism while moving the lower mold to the baking position, actuating the brake mechanism and holding the shaft with the lower mold in the baking position, and moving the lower mold away from the upper mold by releasing the spring obtaining a rapid venting of the mold cavity and expansion of the grain.

In alternative embodiments, the brake system and method can be used with the upper mold and with both lower and upper molds. Of course, where the machine and its operation is described and claimed as having the braking mechanism with the lower mold, a machine having the braking mechanism with the upper mold is the equivalent.

Expressed somewhat differently, the preferred embodiment of the invention includes a heated moveable top mold, a heated moveable bottom mold and a fixed ring mold. The top and bottom molds are each mounted respectively to a vertically extending mold post that is located through a bearing housing and actuated by a cylinder. The ring mold is fixed and supported on the bottom mold post bearing housing.

Attached to the bottom mold post is a brake bar, a spring block and a mold post cap. Disc-like brakes are fixed to the machine frame to hold the brake bars when engaged. The mold post cap is pinned to a cushioning block, permitting relative movement thereto. Thus, for example, when the bottom cylinder is actuated to move the bottom mold post up, the cushioning block bears against the mold post cap to push the bottom mold into the fixed ring mold. The spring block also comes in contact with a bearing plate, giving a positive vertical position for the bottom mold in relation to the fixed ring mold. In this position, the springs in the spring block are compressed.

Preferably, the cake forming machine is operated by raising the top mold to its full up position and lowering the bottom mold to approximately a mid-level position in the ring mold (step 1). Grain, such as rice or popcorn, is loaded into the cavity formed by the bottom mold and the ring mold. The upper mold is then lowered into the ring mold, and the bottom mold is moved up to compress, and when desired crush the grain (step 2). After compression, the bottom brake is locked against the lower brake bar and the bottom cylinder is actuated to retract the cushioning block, leaving approximately a ¾ inch gap between the cushioning block and the mold post cap. After a suitable cooking period has passed, the bottom brake is released and the springs suddenly lower the bottom mold to permit the popcorn to expand and vent (step 3). The top mold is then raised out of the ring mold and the bottom mold is raised to the top of the ring mold to permit discharge of the cooked cake (step 4).

DESCRIPTION OF THE PREFERRED EMBODIMENTS

Figure 1:
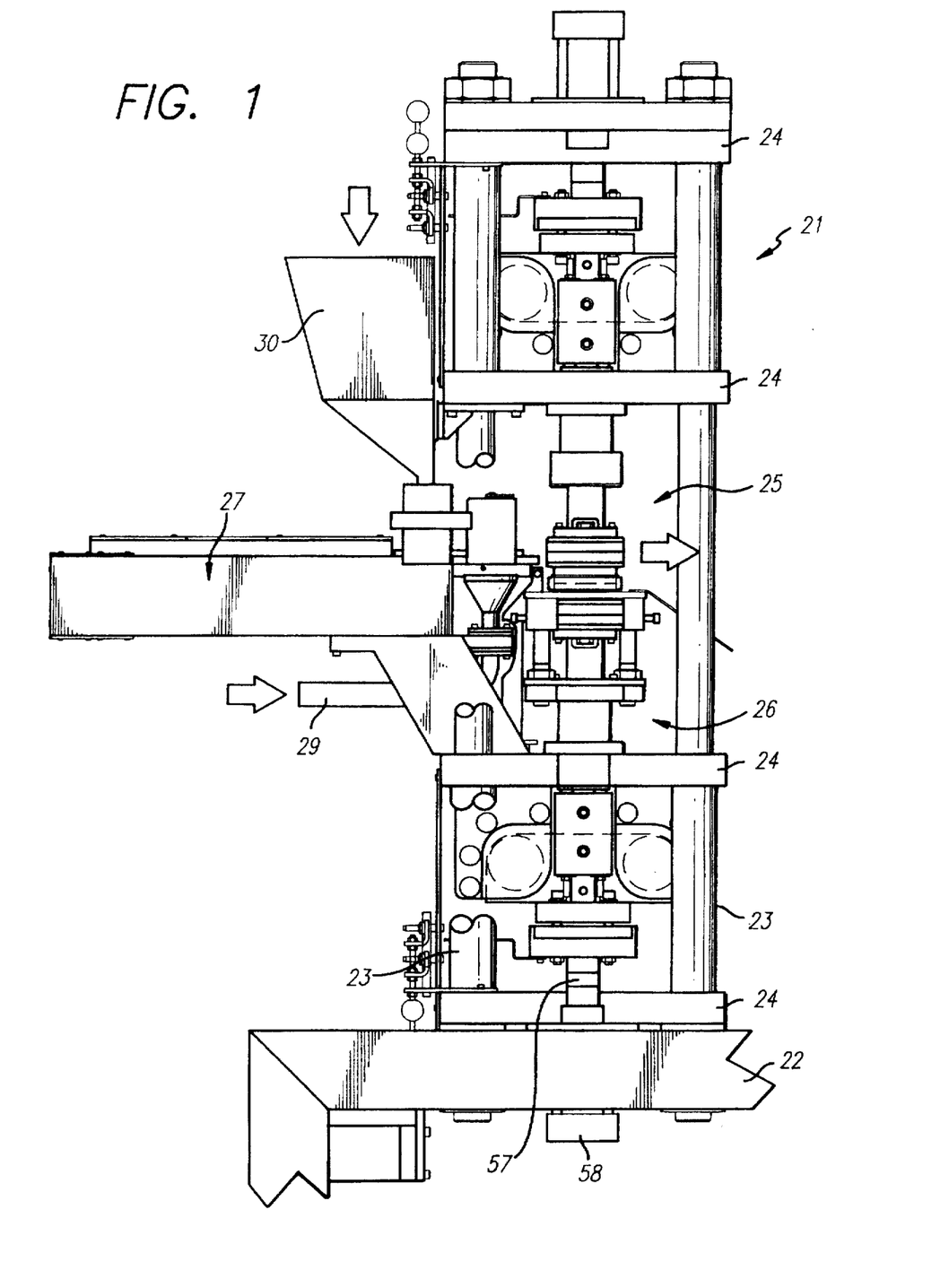
FIG. 1 is a side view of a grain baking apparatus incorporating the presently preferred embodiment of the invention.

The grain cake baking machine as shown in FIG. 1 includes a frame or housing 21 resting on a base 22 and having four vertical support posts 23 and four horizontal plates 24.

The machine includes an upper mold and drive 25, a lower mold and drive 26, and a feed and discharge unit 27. The feed unit includes an inlet 29 for warm air, and a hopper 30 for the grain. The warm air may be used to preheat a charge of grain in the feed unit, but is not used in the presently preferred embodiment. With the exceptions to be described below, the construction and operation of these components is conventional and the corresponding structures in the prior patents may be utilized as desired. The new features of the present invention are in the new brake mechanism in the mold drive and the method of operation with this brake mechanism.

A brake mechanism is shown and described for the lower mold and a similar brake mechanism is shown and described for the upper mold. In the actual baking machine, braking mechanisms can be used for both upper and lower molds or only for the upper mold or only for the lower mold, as desired. The upper and lower brake mechanisms will be identical, and in the presently preferred embodiment, a brake mechanism is used only with the lower mold.

Figure 2:
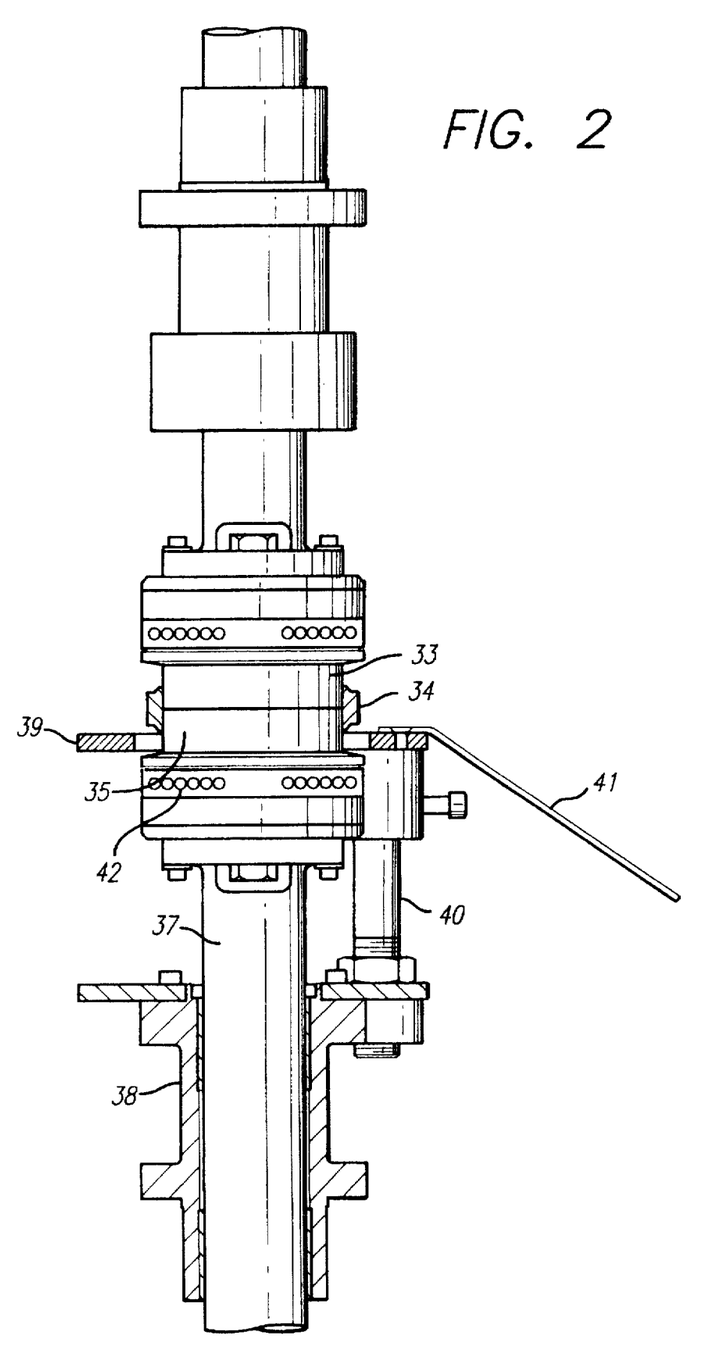
FIG. 2 is an enlarged view of a portion of the apparatus of FIG. 1 showing the mold components.

Turning to FIG. 2, the machine includes an upper mold 33, a ring mold 34 and a lower mold 35. The ring mold is fixed in the frame, with the upper and lower molds moving toward and away from each other. Typically the molds are cylindrical with flat faces defining a cylindrical cake. Of course, other shapes for the molds can be used if desired.

The lower mold drive with braking mechanism will be described in detail. The upper mold and drive may be identical or may omit the braking mechanism, as desired. The lower mold 35 is carried on a drive member for vertical motion toward and away from the upper mold, here a shaft or post 37 which slides in a sleeve 38 carried in the frame. A plate 39 is positioned around the lower mold and carried on one or more posts 40 supported on the frame, with a cake discharge chute 41 carried on the plate 39. A heating element, typically an electrical resistance heater 42, is carried in the lower mold for heating the mold for the baking operation.

Figure 7:
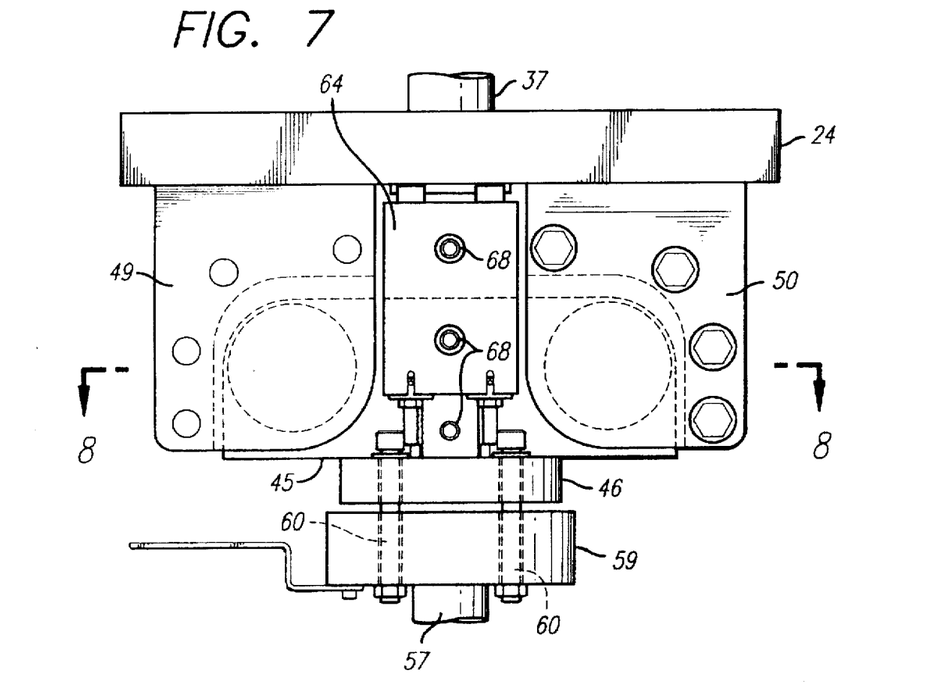
FIG. 7 is an enlarged view of a portion of FIG. 1 showing the lower spring and brake mechanisms.
Figure 8:
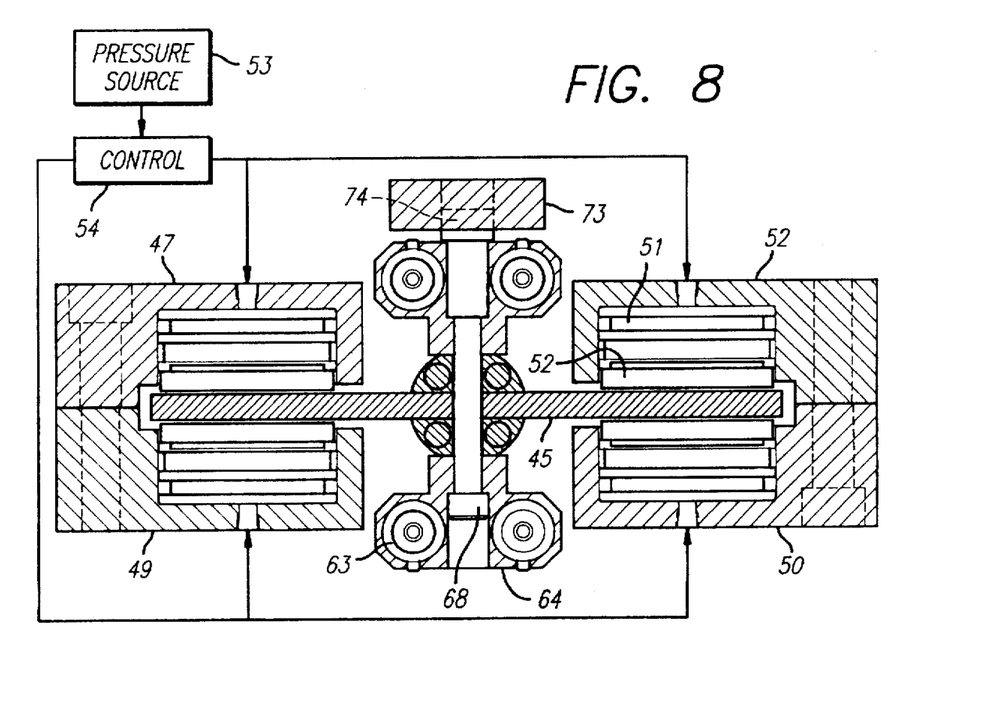
FIG. 8 is an enlarged sectional view taken along the line 8—8 of FIG. 7.
Figure 9:
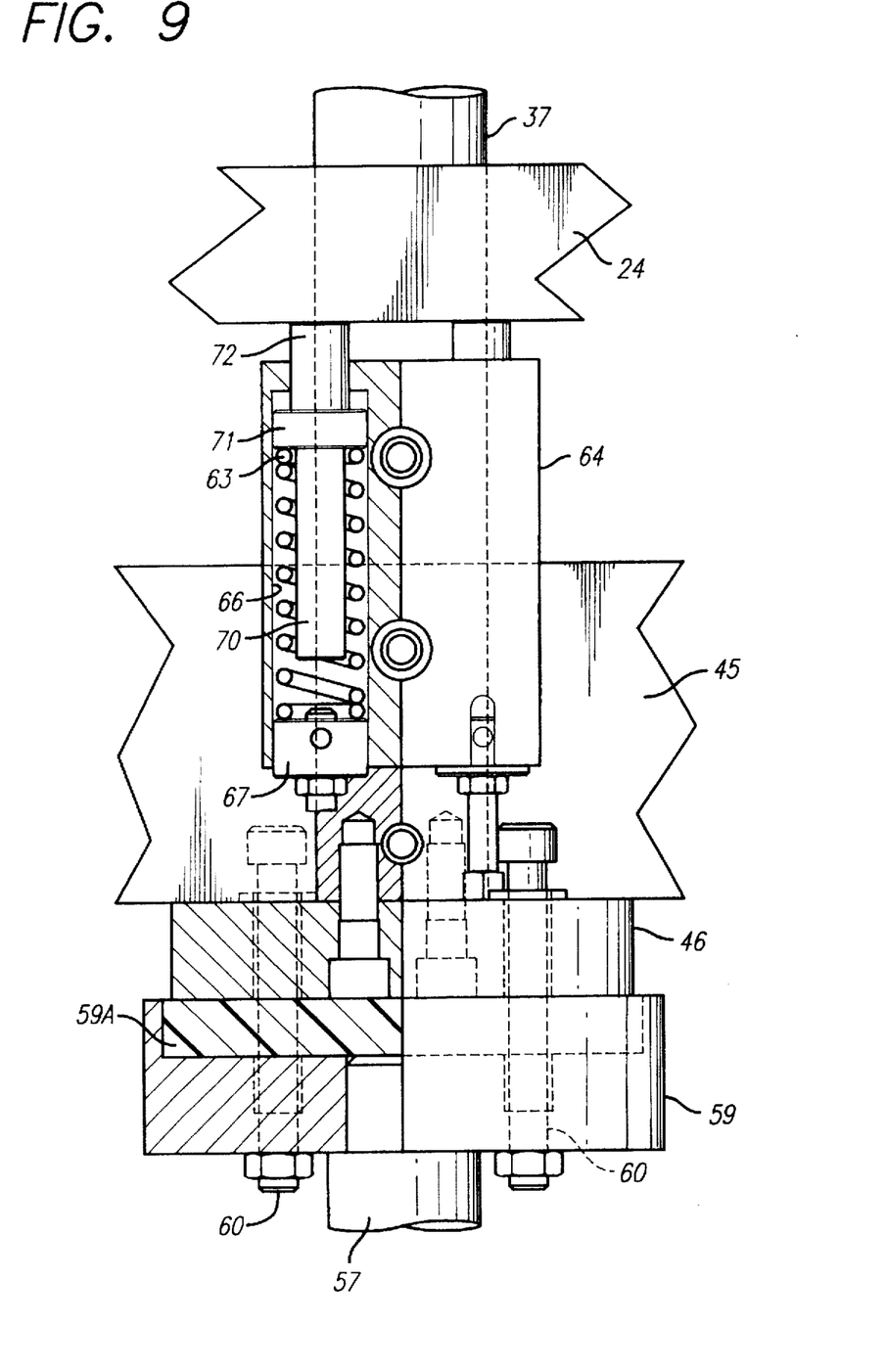
FIG. 9 is an enlarged view, partly in section, of FIG. 7 showing the components in the load position.

Turning to FIGS. 7–9, a brake plate 45 is attached to a brake base or mold post cap 46 which in turn is connected to the lower mold post or shaft 37. Pressure operated brakes 47, 48, 49, 50 are positioned respectively on each side of each arm of the brake plate 45. Each brake includes a cylinder 51 driving a piston 52 into braking engagement with the brake plate 45. The machine includes a pressure source 53 and a control unit 54 for supplying fluid under pressure to the brakes during the operating sequence of the machine. Other conventional forms of brakes may be used if desired. A hydraulic pressure system is preferred, but a pneumatic system could be used.

The lower mold drive includes another drive member or shaft 57 connected to the piston of a drive cylinder 58 carried in the frame 22. A drive plate 59 is carried on the upper end of the shaft 57 and may move vertically relative to the brake base 46 on guide bolts 60. An elastomer block 59A may be inserted in the upper face of the drive plate 59.

Four springs 63 are carried in two spring housings 64, with two springs in each housing. Each housing has a spring cavity 66 closed at the bottom by a plug 67. The spring housings are joined together and joined to the brake plate 45 by horizontal bolts 68.

A pin 70 is positioned within each spring 64, with a shoulder 71 for bearing against the upper end of the spring, and with an extension 72 projecting upward out of the housing to engage the frame plate 24 for compressing the spring when the brake plate and spring housing are moved upward. Various conventional spring constructions may be used as desired. An anti-rotate cam plate 73 may be carried in the housing, with a vertical slot for receiving the head 74 of one of the bolts 68. This arrangement permits vertical motion of the spring housings while preventing rotation of the components.

The finished cake typically is a simple cylinder, and for such a product upper and lower mold orientation is not significant, but for other cake configurations the rotational position of the upper and lower molds must be maintained to obtain the desired registration of the two parts. One example of this is where a plurality of smaller cakes are produced, such as with each mold having several mating openings for cakes which must be aligned.

The operation of the baking machine is illustrated in FIGS. 3–6 and FIGS. 9–12.

Figures 3, 4:
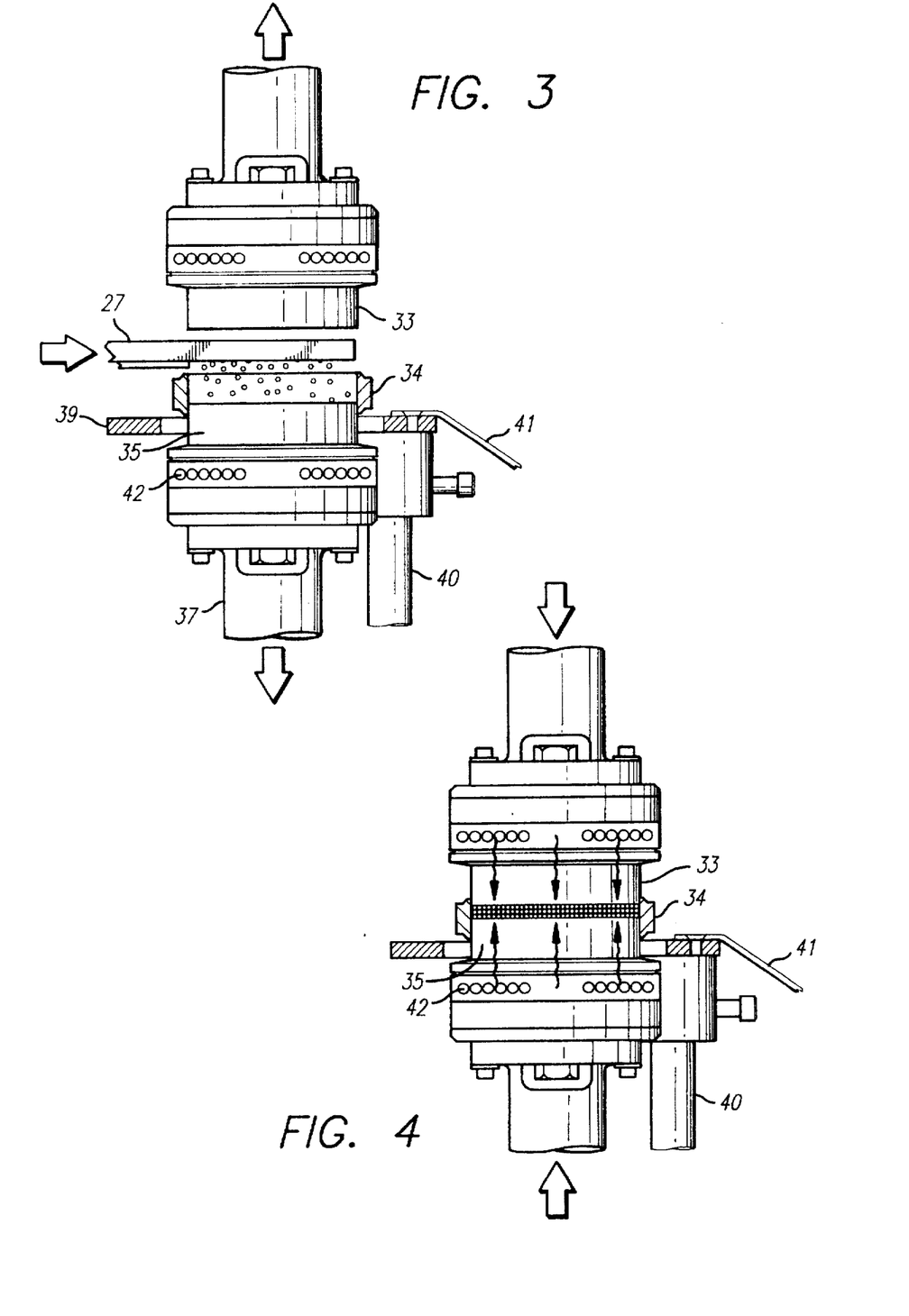
FIG. 3 is a view similar to that of FIG. 2 showing the upper mold in the load position and the unload position and the lower mold in the load position and the vent position.
FIG. 4 is a view similar to that of FIG. 3 showing the molds in the baking positions having compressed the grain.

In FIG. 3, the upper mold is shown in the load and the unload positions and the lower mold is shown in the load and the vent positions. The transfer slide from the feed and discharge unit 27 moves laterally to position the grain carrying opening of the slide over the ring mold, with a charge of grain falling into the ring mold onto the lower mold. Then the transfer slide is retracted.

Next the grain is compressed in the mold and if desired, crushed, and then heated. This is accomplished by moving the upper mold downward and the lower mold upward to the positions of FIG. 4. Here the upper mold is in the compressed and baking position and the lower mold is in an intermediate position also known as the compress and baking position.

Figure 10:
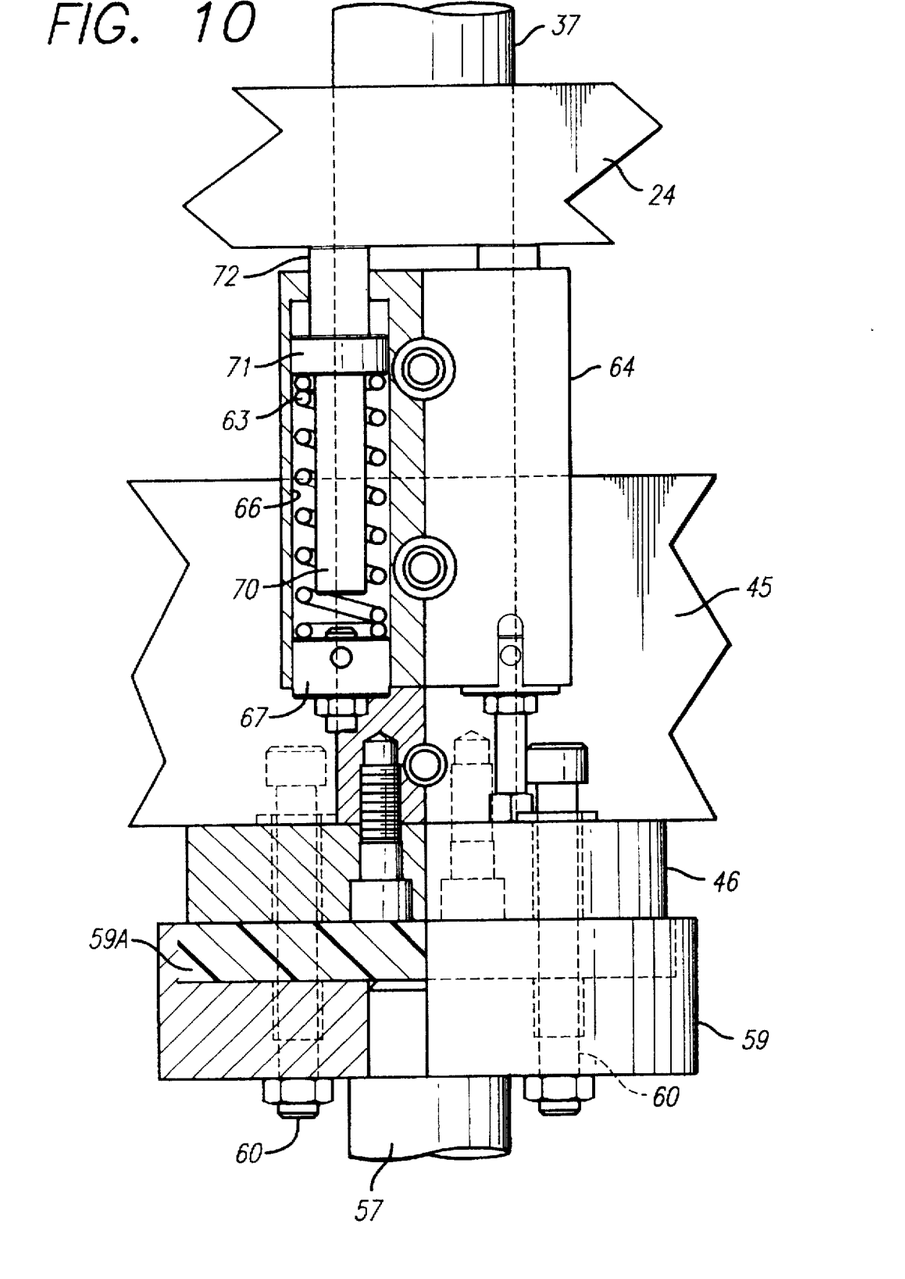
FIG. 10 is a view similar to that of FIG. 9 showing the components in the baking position with the springs compressed.
Figure 11:
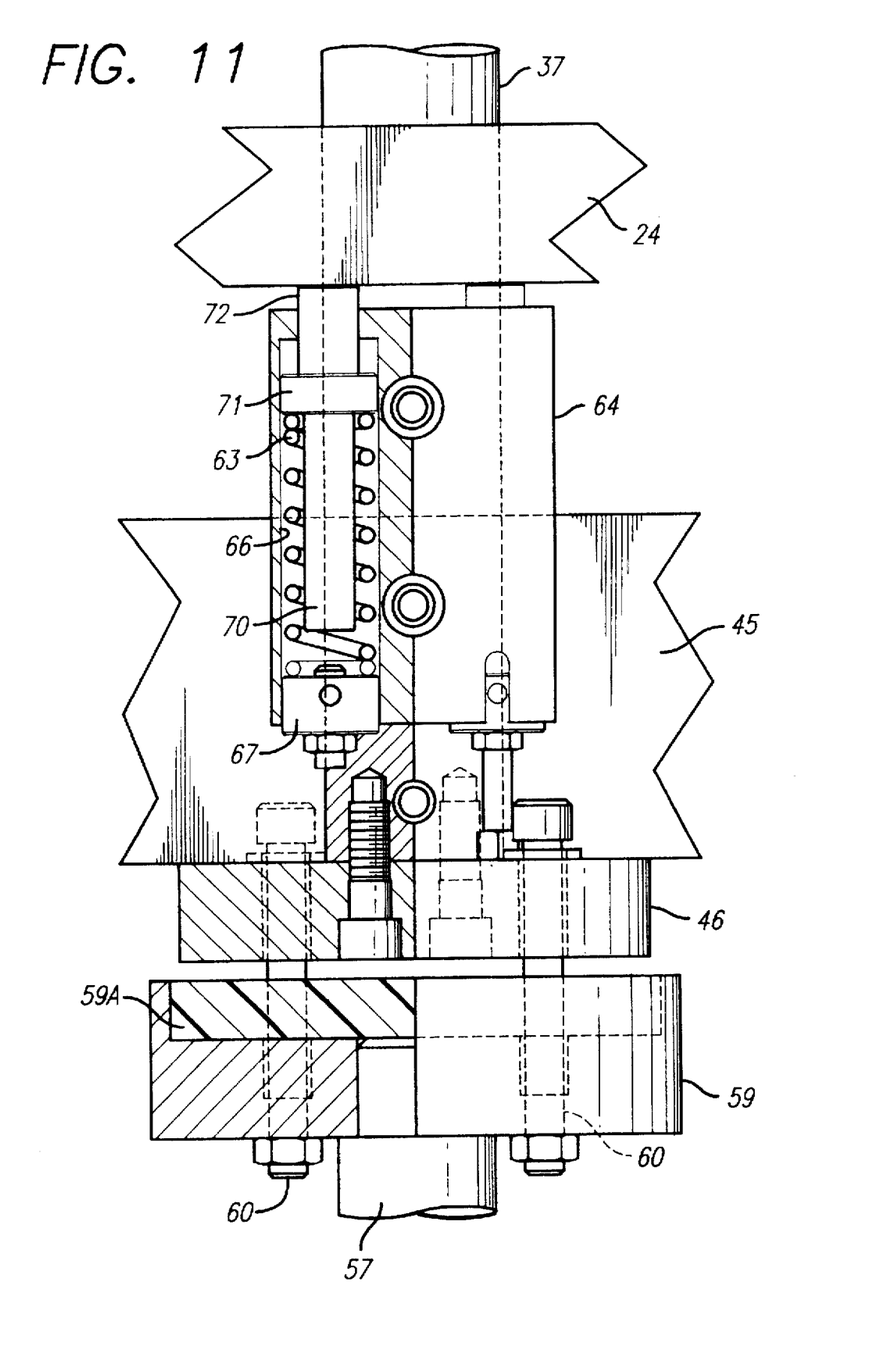
FIG. 11 is a view similar to that of FIG. 10 showing the components in the baking position with the springs compressed and the drive plate/elastomer block lowered.
Figure 12:
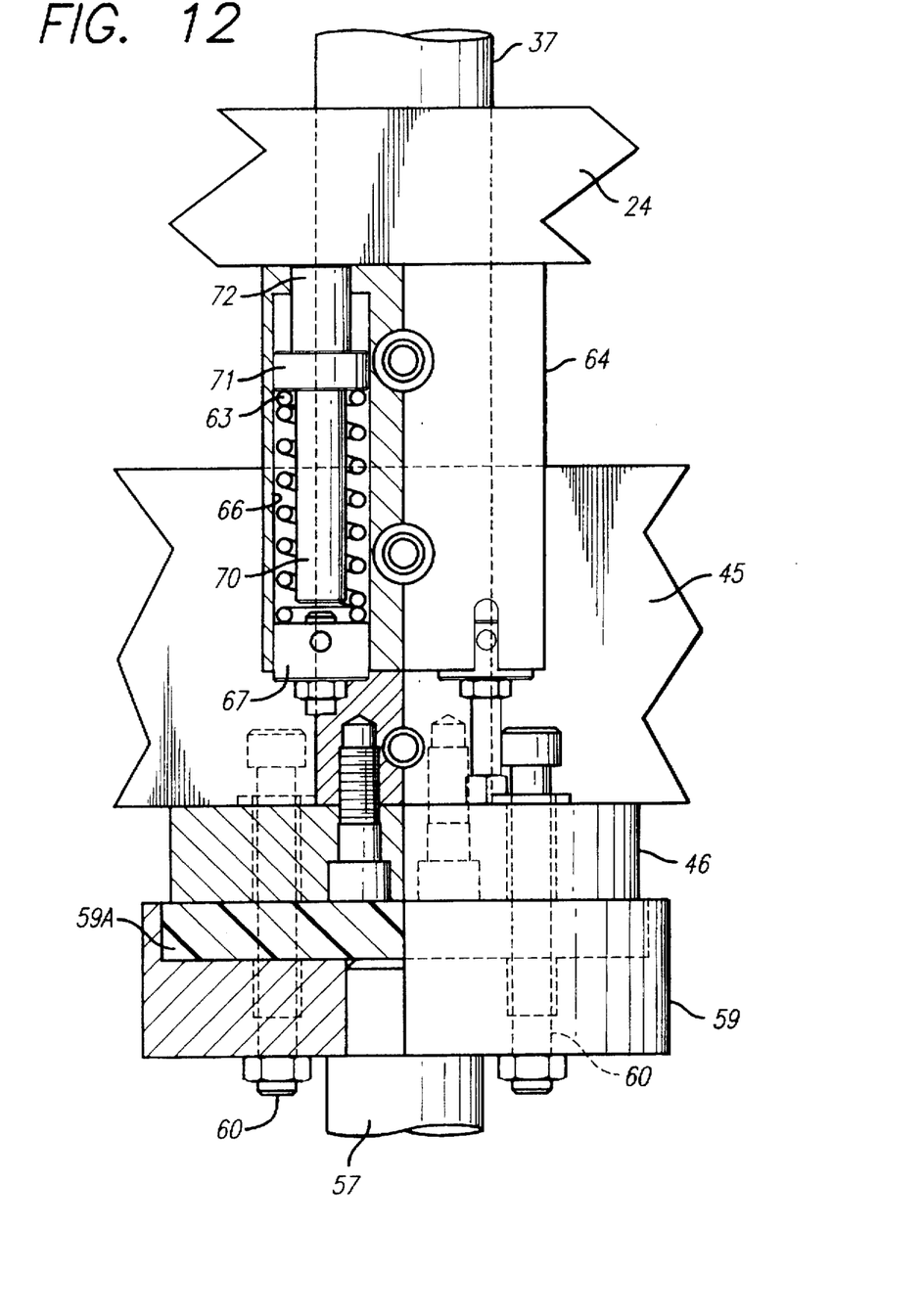
FIG. 12 is a view similar to that of FIG. 9 showing the components in the unload position.

While the molds are moved to the position of FIG. 4, the springs are compressed as shown in FIG. 10, and the brakes are energized to clamp the brake plate in the brake housings. Next the cylinder 58 is actuated to move the drive shaft 57 downward from the position of FIG. 10 to the position of FIG. 11, with the braking mechanism holding the lower mold in the position of FIG. 4.

Figures 5, 6:
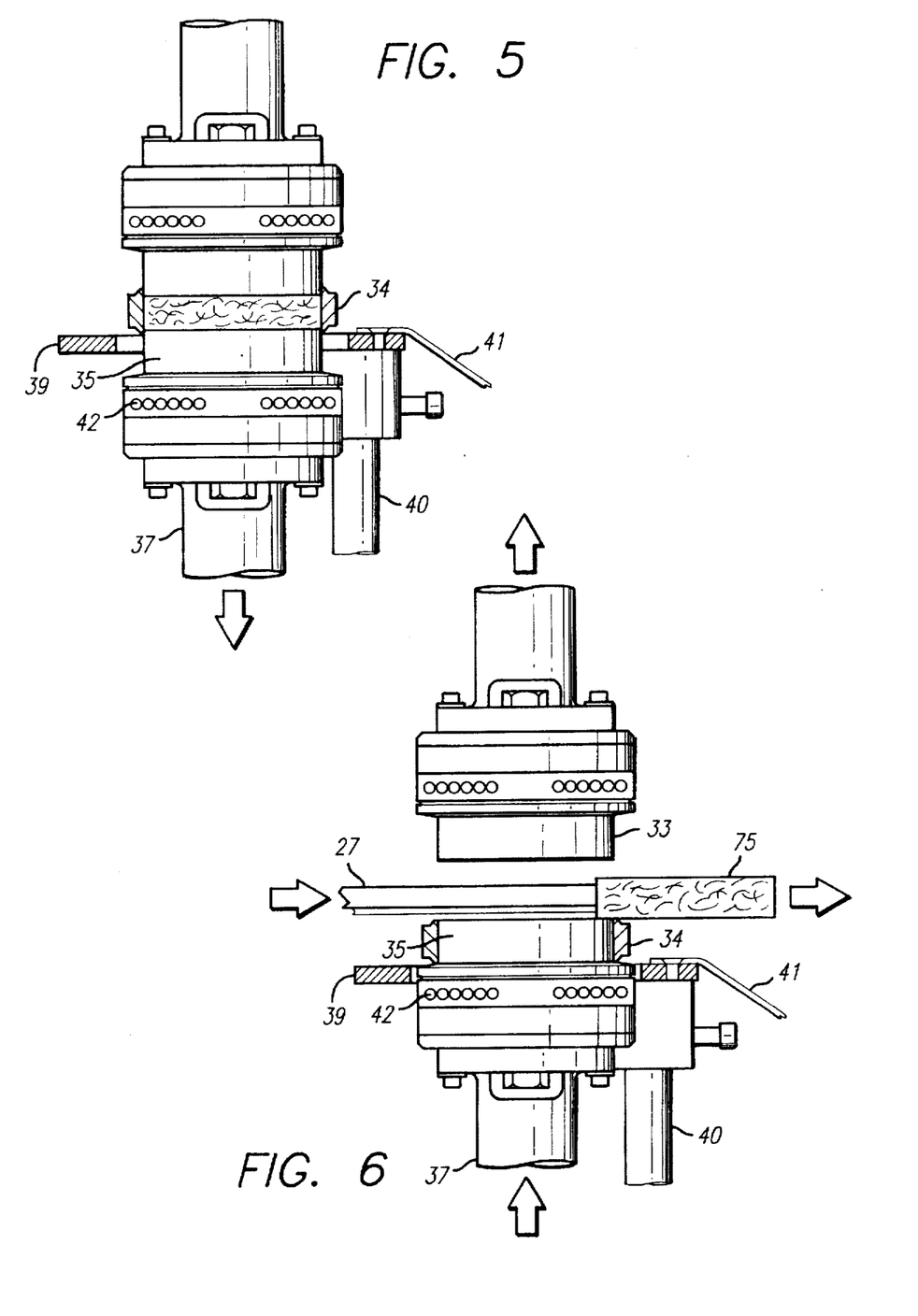
FIG. 5 is a view similar to that of FIG. 3 showing the lower mold in the vent position following expansion of the grain.
FIG. 6 is a view similar to that of FIG. 3 showing the molds in the unload positions.

After the time for baking has expired, the brakes are released and the compressed springs expand, driving the lower mold down to the position of FIG. 5, with the brake plate moving down to the position of FIG. 9. This very fast downward motion of the lower mold is achieved with the release of the brake plate now driven by the steam formed in the mold and by the expanding springs. This operation provides very rapid increase in volume of the space between the lower and upper molds and achieves the desired rapid expansion of the heated grain. There is a small clearance between the ring mold and the lower mold, for circular components typically a difference in diameter of about 0.003 inches. When the lower mold is in the baking position there is little or no venting downward between the ring mold and the lower mold. However, when the lower mold is moved downward to the vent position, with the lower mold nearly out of the ring mold, this clearance provides for rapid venting of the steam. The illustration of FIG. 5 is for the embodiment with braking mechanism only on the lower mold. If a braking mechanism is also utilized with the upper mold, there will be a corresponding upward motion of the upper mold.

When the brake base 46 strikes the block 59A, the impact may produce vibration and noise. If it is desired to reduce the vibration or noise, a conventional shock absorber may be incorporated in the drive system. The shock absorber could be selected to reduce the velocity of the downward movement, typically by about 20 percent. Preferably the initial downward velocity would be unchanged for the first half of the motion, with the shock absorber gradually reducing the velocity to the desired amount by the time of impact.

If desired in the embodiment using the brake control for both upper and lower molds, the two molds can be released for the expansion step at different times, typically a few milliseconds apart. By having the two molds move at different times, the noise and the vibrations resulting from the simultaneous impact at two of the brake base blocks 59A is reduced. This can be important in a factory environment, especially where a number of baking machines are in operation.

The baked cake is now ready for unloading. The lower mold is raised to the unload position of FIG. 6, with the upper surface of the mold in line with the upper surface of the ring mold, and the upper mold is moved upward above the ring mold a distance to permit lateral motion of the cake, as shown in FIG. 6 with both molds in the unload positions. The transfer slide of the feed and discharge unit again moves laterally between the molds to move the cake 75 away from the molds and onto the discharge chute 41. The machine is now ready for return to the position of FIG. 3 and loading of another charge of grain.

If desired after the expansion step, the lower mold may be moved upward in the ring mold a short distance, to reduce the thickness of the finished product. For some products, the baker may desire some recompression of the grain. Also such a recompression step can provide an improved control of product thickness.

One advantage of the rapid movement of the lower mold in the venting operation is the increased expansion of starch in the grain. This results in a light and crispy texture in the finished cake. Also the very rapid opening of the mold does not limit the expansion rate of the heated grain, as can be the case with a slower opening mold.

Another advantage is that the water evaporates and the cake cools quickly avoiding any development of a scorched flavor to the product.

Also the rapid venting and cooling achieved with the present design allows the use of higher baking temperatures and shorter baking time and thereby an increase in production rate.

Also the new construction permits accurate control of the lower mold in the vent position very close to the bottom of the ring mold, but not out of the ring mold. This prevents pieces of grain from being expelled from the mold during venting, with the resultant holes in the product and reduction in yield. Also the thickness of the product is more consistent. By way of example, in some prior machines, a cake of nominal thickness of one-half inch can vary plus-minus more than one-sixteenth to one-eight inch, while the machine of the present invention maintains thickness variation to less than plus-minus one-sixteenth of an inch.

Another advantage of the present mold drive with the quick release brake construction is the ability to adjust the timing of mold opening to a few milliseconds, for precise control of the baking process.

With the upper and lower molds driven separately and independently of each other and of the ring mold, the operation of the baking machine is readily adjusted for various sizes of product and for various sequences of steps.

I claim:

1. In a grain cake baking machine, the combination of:
   an upper mold, a ring mold and a lower mold, with said upper and lower molds sliding in said ring mold and defining a mold cavity;
   first means for moving said lower mold relative to said ring mold between a vent position and an intermediate baking position, and an unload position extending to the upper end of said ring mold for discharging a cake;
   second means for moving said upper mold relative to said ring mold between a load position out of said ring mold for loading grain and unloading a cake, and a baking position within said ring mold;
   third means for loading a charge of grain into said ring mold when said upper and lower molds are in said load positions;

said first means having a first drive member, and a second drive member movable axially with respect to said first drive member, with said lower mold carried by said second drive member, said first drive member including means for moving said lower mold to said intermediate baking position and to said unload position, said first means further including means for retaining said second drive member and lower mold in said intermediate baking position while moving said first drive member to said vent position, said second drive member including means for moving said second drive member toward said first drive member; and means for heating said upper and lower molds.

2. A baking machine as defined in claim 1 with said ring mold mounted in a housing and wherein said second drive member further includes:

a shaft mounted in said housing for movement toward and away from said ring mold and carrying said lower mold;

a brake bar carried on said shaft;

brake means for clamping said brake bar in a fixed position in said housing;

spring means between said shaft and said housing for urging said shaft and lower mold away from said ring mold; and means for actuating said brake means to clamp said brake bar, shaft and lower mold in said baking position, with said spring means moving said lower mold to said vent position when said brake means is actuated to release said brake bar.

3. In a grain cake baking machine, the combination of:

an upper mold, a ring mold and a lower mold, with said upper and lower molds sliding in said ring mold and defining a mold cavity;

first means for moving said lower mold relative to said ring mold between a vent position and an intermediate baking position, and an unload position extending to the upper end of said ring mold for discharging the cake;

second means for moving said upper mold relative to said ring mold between a load position out of said ring mold for loading grain and unloading a cake, and a baking position and an intermediate vent position both within said ring mold;

third means for loading a charge of grain into said ring mold when said upper and lower molds are in said load positions;

said first means having a first drive member, and a second drive member movable axially with respect to said first drive member, with said lower mold carried by said second drive member, said first drive member including means for moving said lower mold to said intermediate baking position and to said unload position, said first means further including means for retaining said second drive member and lower mold in said intermediate baking position while moving said first drive member to said vent position, said second drive member including means for moving said second drive member toward said first drive member;

said second means having a first drive member, and a second drive member movable axially with respect to said first drive member, with said upper mold carried by said second drive member, said first drive member including means for moving said upper mold to said load position and to said baking position, said second means further including means for retaining said second drive member and upper mold in said baking position while moving said first drive member to said intermediate vent position, said second drive member including means for moving said second drive member toward said first drive member; and means for heating said upper and lower molds.

4. A baking machine as defined in claim 3 with said ring mold mounted in a housing and wherein each of said second drive member further includes:

a shaft mounted in said housing for movement toward and away from said ring mold and carrying one of said lower and upper molds.

a brake bar carried on said shaft;

brake means for clamping said brake bar in a fixed position in said housing;

spring means between said shaft and said housing for urging said shaft and the mold carried on the shaft away from said ring mold; and means for actuating said brake means to clamp said brake bar, shaft and mold in said baking position, with said spring means moving said mold to said vent position when said brake means is actuated to release said brake bar.

5. In a grain cake baking machine, the combination of:

an upper mold, a ring mold and a lower mold, with said ring mold mounted in a housing and with said upper and lower molds sliding in said ring mold and defining a mold cavity;

first means for moving said lower mold relative to said ring mold between a vent position and an intermediate baking position, and an unload position extending to the upper end of said ring mold for discharging a cake;

second means for moving said upper mold relative to said ring mold between a load position out of said ring mold for loading grain and unloading a cake, and a baking position within said ring mold;

third means for loading a charge of grain into said ring mold when said upper and lower molds are in said load positions; and means for heating said upper and lower molds;

said first means including:

a shaft mounted in said housing for movement toward and away from said ring mold and carrying said lower mold;

a brake bar carried on said shaft;

brake means for clamping said brake bar in a fixed position in said housing;

spring means between said shaft and said housing for urging said shaft and lower mold away from said ring mold;

drive means for moving said shaft and lower mold to said baking position; and means for actuating said brake means to clamp said brake bar, shaft and lower mold in said baking position, with said spring means moving said lower mold to said vent position when said brake means is actuated to release said brake bar.

6. In a grain cake baking machine, the combination of:

an upper mold, a ring mold and a lower mold, with said upper and lower molds sliding in said ring mold and defining a mold cavity;

first means for moving said lower mold relative to said ring mold between a load position and an intermediate baking position, and an unload position extending to the upper end of said ring mold for discharging a cake;

second means for moving said upper mold relative to said ring mold between a load position out of said ring mold for loading grain and unloading a cake, and a baking position and a vent position;

third means for loading a charge of grain into said ring mold when said upper and lower molds are in said load positions;

said second means having a first drive member, and a second drive member movable axially with respect to said first drive member, with said upper mold carried by said second drive member, said first drive member including means for moving said upper mold to said baking position and to said unload position, said second means further including means for retaining said second drive member and upper mold in said baking position while moving said first drive member to said vent position, said second drive member including means for moving said second drive member toward said first drive member; and means for heating said upper and lower molds.

7. A baking machine as defined in claim 6 with said ring mold mounted in a housing and wherein said second drive member further includes:

a shaft mounted in said housing for movement toward and away from said ring mold and carrying said upper mold;

a brake bar carried on said shaft;

brake means for clamping said brake bar in a fixed position in said housing;

spring means between said shaft and said housing for urging said shaft and upper mold away from said ring mold; and means for actuating said brake means to clamp said brake bar, shaft and upper mold in said baking position, with said spring means moving said upper mold to said vent position when said brake means is actuated to release said brake bar.

8. In a method of baking a grain cake in a baking machine having a housing with an upper mold, a ring mold and a lower mold, with the upper and lower molds sliding in the ring mold and defining a mold cavity, the steps of:

carrying the lower mold in a two part mold drive with the first part connected to the housing and with the second part connected to the lower mold and with the second part movable relative to the first part;

moving the lower mold away from the upper mold to a load position;

loading a charge of grain into the ring mold;

moving the lower and upper molds toward each other to a baking position within the ring mold to compress the grain;

heating the lower and upper molds to heat the compressed grain;

moving the first part of the lower mold drive away from the second part of the lower mold drive while retaining the lower mold in the baking position;

moving the lower mold away from the upper mold by releasing the second part of the lower mold drive to expand the heated grain and vent gas from the mold cavity;

moving the upper mold upward out of the ring mold and moving the lower mold upward at least to the upper end of the ring mold; and moving the baked cake out of the machine.

9. The method of claim 8 wherein the second part of the lower mold drive of the baking machine includes a spring loaded shaft carrying the lower mold and a brake mechanism for holding the shaft in a spring loaded position, and including the steps of:

loading the spring while moving the lower mold to the baking position;

actuating the brake mechanism and holding the shaft with the lower mold in the baking position; and moving the lower mold away from the upper mold by releasing the spring obtaining a rapid venting of the mold cavity and expansion of the grain.

10. In a method of baking a grain cake in a baking machine having a housing with an upper mold, a ring mold and a lower mold, with the upper and lower molds sliding in the ring mold and defining a mold cavity, the steps of:

carrying each of the lower mold and the upper mold in a two part mold drive with the first part connected to the housing and with the second part connected to the mold and with the second part movable relative to the first part;

moving the lower mold away from the upper mold to a load position;

loading a charge of grain into the ring mold;

moving the lower and upper molds toward each other to a baking position within the ring mold to compress the grain;

heating the lower and upper molds to heat the compressed grain;

moving the first part of each of the mold drives away from the second part of each of the mold drives while retaining the molds in the baking position;

moving the molds away from each other by releasing the second part of each mold drive to expand the heated grain and vent gas from the mold cavity;

moving the upper mold upward out of the ring mold and moving the lower mold upward at least to the upper end of the ring mold; and moving the baked cake out of the machine.

11. The method of claim 10 wherein the second part of each of the lower and upper mold drives of the baking machine includes a spring loaded shaft carrying the mold and a braking mechanism for holding the shaft in a spring loaded position, and including the steps of:

loading each of the springs while moving each of the lower and upper molds to the baking position;

actuating the brake mechanisms and holding the shafts with the lower and upper molds in the braking position; and moving the upper and lower molds away from each other by simultaneously releasing both springs for rapid venting of the mold cavity and expansion of the grain.

12. In a method of baking a grain cake in a baking machine having a housing with an upper mold, a ring mold and a lower mold, with the upper and lower molds sliding in the ring mold and defining a mold cavity, and having a braking mechanism for holding the lower mold in a baking position, the steps of:

moving the lower mold away from the upper mold to a load position;

loading a charge of grain into the ring mold;

moving the lower and upper molds toward each other to a baking position within the ring mold to compress the grain;

heating the lower and upper molds to heat the compressed grain;

actuating the brake mechanism and holding the lower mold in the baking position;

moving the lower mold away from the upper mold by releasing the brake mechanism obtaining a rapid venting of the mold cavity and expansion of the grain;

moving the upper mold upward out of the ring mold and moving the lower mold upward at least to the upper end of the ring mold; and moving the bake cake out of the machine.

13. In a method of baking a grain cake in a baking machine having a housing with an upper mold, a ring mold and a lower mold, with the upper and lower molds sliding in the ring mold and defining a mold cavity, the steps of:

carrying the upper mold in a two part mold drive with the first part connected to the housing and with the second part connected to the upper mold and with the second part movable relative to the first part;

moving the lower mold away from the upper mold to a load position;

loading a charge of grain into the ring mold;

moving the lower and upper molds toward each other to a baking position within the ring mold to compress the grain;

heating the lower and upper molds to heat the compressed grain;

moving the first part of the upper mold drive away from the second part of the upper mold drive while retaining the upper mold in the baking position;

moving the upper mold away from the lower mold by releasing the second part of the upper mold drive to expand the heated grain and vent gas from the mold cavity;

moving the upper mold upward out of the ring mold and moving the lower mold upward at least to the upper end of the ring mold; and moving the baked cake out of the machine.

14. The method of claim 13 wherein the second part of the upper mold drive of the baking machine includes a spring loaded shaft carrying the upper mold and a brake mechanism for holding the shaft in a spring loaded position, and including the steps of:

loading the spring while moving the upper mold to the baking position;

actuating the brake mechanism and holding the shaft with the upper mold in the baking position; and moving the upper mold away from the lower mold by releasing the spring obtaining a rapid venting of the mold cavity and expansion of the grain.

\* \* \* \* \*